Nov. 13, 1934.  C. C. FARMER  1,980,329
BRAKE SHOE CLEARANCE ADJUSTER
Filed May 6, 1933
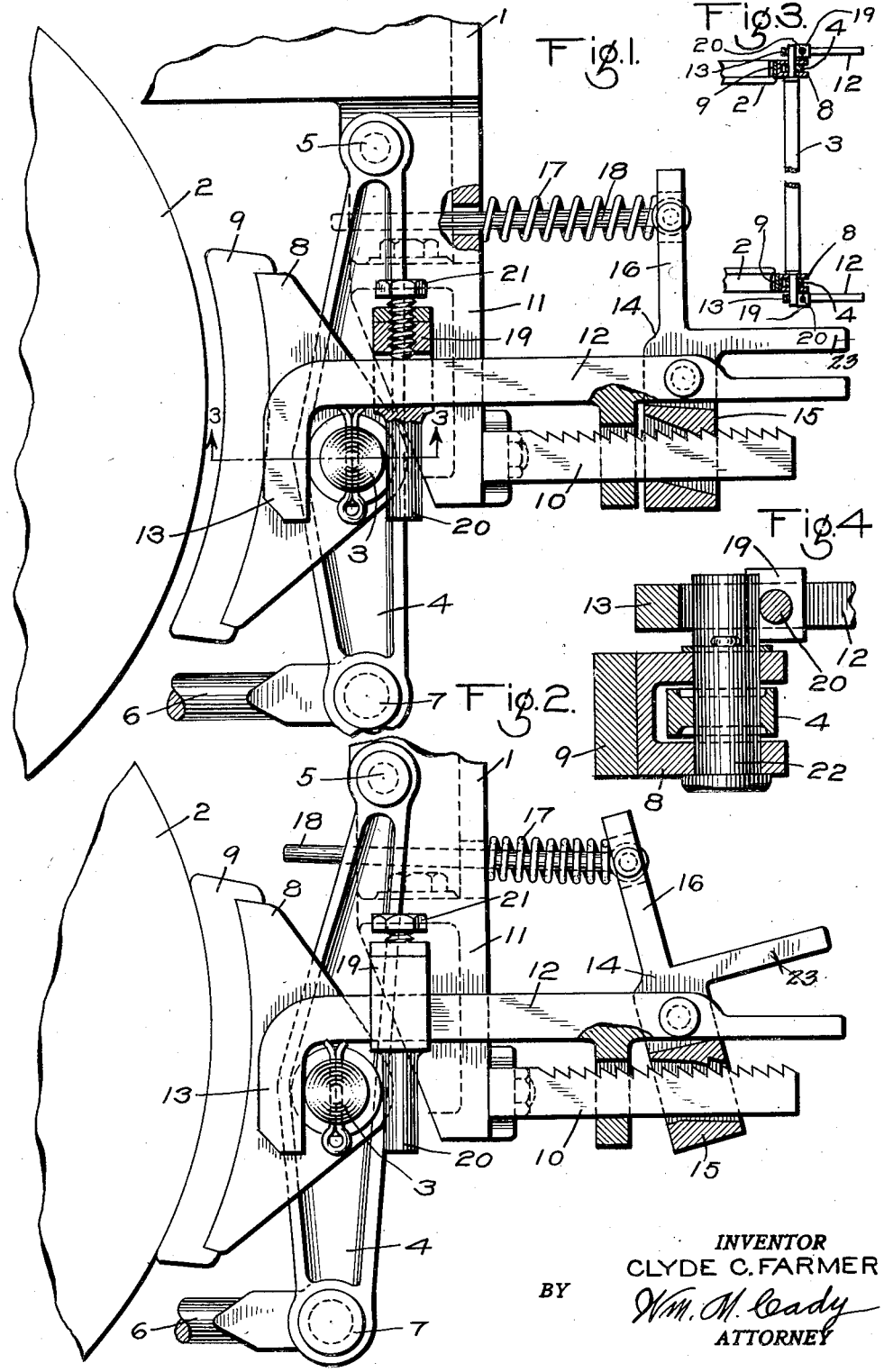
INVENTOR
CLYDE C. FARMER
BY  *Wm. M. Cady*
ATTORNEY Patented Nov. 13, 1934

1,980,329

UNITED STATES PATENT OFFICE 1,980,329

BRAKE SHOE CLEARANCE ADJUSTER

Clyde C. Farmer, Pittsburgh, Pa., assignor to The Westinghouse Air Brake Company, Wilmerding, Pa., a corporation of Pennsylvania Application May 6, 1933, Serial No. 669,756

9 Claims. (Cl. 188—200)

This invention relates to improvements in brake rigging for railway cars and more particularly to the brake rigging carried by the trucks of a car.

With certain types of brake riggings now used on both passenger and freight cars, and more especially with the equalized type of rigging, difficulty is frequently experienced in starting trains due to some of the brake shoes dragging on the wheels when the other elements of the brake rigging are in brake releasing position. One of the reasons for this is that these brake riggings have a predetermined release movement to provide the necessary clearance between the brake shoes and the truck wheels when the brakes are released, which clearance is intended to be evenly distributed, but if some brake shoes are worn more than others, the worn brake shoes will naturally have a greater releasing movement than the others, so that the thicker brake shoes will have a tendency to drag on the wheels.

With that type of brake rigging in which the brake heads, carrying brake shoes for engagement with one side of one pair of truck wheels, are connected together across the truck by means of a brake beam or bar, it has been found that, due to uneven wear of the brake shoes and wear and distortion of the several other elements of the brake rigging, the brake beams or bars are liable to assume undue angular positions with relation to the truck wheels when the brakes are being released. When a brake beam assumes such a position, the brake shoe carried by the brake head mounted on one end of the beam may move out of engagement with the wheel at one side of the truck, while the brake shoe at the other end of the beam may remain in contact with the adjacent wheel. By reason of this it will be seen that the above mentioned difficulty of maintaining the proper uniform clearance between the brake shoes and the treads of the truck wheels is aggravated.

All of the above characteristics of the brake riggings in use are very objectionable, in that they tend to resist the starting of a train, and besides this, cause undue wear of the brake shoes and treads of the wheels.

The principal object of my invention is to provide a brake rigging with means adapted to function automatically to overcome the above mentioned objectionable features.

Another object of the invention is to provide a brake rigging having means for insuring the movement of each brake shoe a predetermined distance away from the tread of an adjacent truck wheel when releasing the brakes, regardless of the wear of the brake shoes.

Other objects and advantages will appear in the following more detailed description of the invention.

In the accompanying drawing; Fig. 1 is a fragmentary side elevational view of a car truck and brake rigging embodying my invention which, for the sake of clarity, is partly shown in section, the several parts of the brake rigging being shown in their release position; Fig. 2 is a similar view showing the rigging in application position; Fig. 3 is a sectional view on a reduced scale taken on the line 3—3 of Fig. 1; and Fig. 4 is a sectional view showing my invention embodied in a beamless brake rigging.

According to my invention, I associate with each end of each brake beam or with each pin connecting a brake shoe head and hanger of a brake rigging and the truck frame, a mechanism for limiting the release movement of the adjacent end of the brake beam or hanger and associated brake head and shoe to insure a uniform clearance between every brake shoe and treads of the truck wheels.

In Figs. 1, 2 and 3 of the drawing the invention is shown associated with one brake beam, but from the foregoing description it will be understood that it may be associated with each brake beam.

Referring now in detail to the drawing, the reference character 1 indicates a truck frame which may be of any desired type or construction and which is carried in the usual manner by a plurality of pairs of wheels 2, only a portion of one end of the frame and one pair of wheels being shown.

The truck brake rigging shown in Figs. 1, 2 and 3 may be of any desired type having brake beams. For illustrative purposes, a single brake beam 3 is shown which is supported adjacent each of its ends by a hanger lever 4 which is pivotally connected at its upper end to the truck frame by a pin 5, said lever, at its lower end, being operatively connected to a pull rod 6 by means of a pin 7. Each end of the brake beam extends through the adjacent hanger lever at a point intermediate the ends of the lever. Suitably secured to each end of the brake beam is a brake shoe head 8 carrying the usual brake shoe 9 for engagement with the tread of one side of an adjacent truck wheel.

The ends of the brake beam, in the present embodiment of the invention, extend outwardly a short distance beyond the brake heads 8 and are adapted to cooperate, as will hereinafter more fully appear, with the mechanisms for limiting the releasing movement of the brake beam.

Each of these limiting mechanisms preferably comprises a toothed ratchet bar 10 which is rigidly secured to a rigid bracket 11 carried by and depending from the truck frame. Slidably mounted on the ratchet bar 10 is an adjusting bar 12 having, at one end, a lug 13 which is adapted to be engaged by the brake beam when the beam is moved to effect an application of the brake shoes to the truck wheels. Pivotally mounted on the bar 12, adjacent its other end, is detent member or pawl 14 having an arm 15 provided with ratchet teeth for engagement with the teeth of the ratchet bar 10, and also having an arm 16 which extends above the adjusting bar 12 and which, adjacent its upper end, is constantly subject to the pressure of a spring 17 which is carried by a rod 18 pivotally connected, at one end, to the arm 16. The other end of the rod extends through an opening in the bracket 7, which opening is of a diameter great enough to permit free movement of the rod relative to the bracket.

Adjustably mounted on the adjusting bar 12 is a stop member 19 having a stop 20 which depends from the bar 12 into the path of travel of the brake beam and which, as will hereinafter appear, is adapted to limit the releasing movement of the brake beam. For the purpose of holding the stop member in any desired adjusted position, a bolt 21 is provided which has screw-threaded connection with the member and which is adapted to clamp the member firmly to the adjusting bar.

When the brakes are in release position, as shown in Fig. 1 of the drawing, the brake beam 3 is in engagement with the stop 20 of the member 19 and the teeth on the arm 15 of the pawl, carried by the bar 12, are maintained in engagement with the teeth of the ratchet bar 10 by the action of the spring 17, so that the adjusting bar 12 is locked against movement in a direction toward the right hand. With the adjusting bar thus locked, the stop member 19 maintains the brake beam 3 in position to provide the desired clearance between the face of the brake shoe 9 and the tread of the wheel with which the shoe is adapted to engage. It will be noted that when the brake beam is in engagement with the stop member 19, there is a clearance space between the brake beam and the lug 13 of the adjusting bar 12 which corresponds to the clearance space between the brake shoe and the wheel, so that when an application of the brakes is being effected, the brake beam will not engage the lug 13 before the brake shoe engages the wheel.

As the brake shoe and tread of the wheel wear, the beam will, of course, be moved in a direction toward the wheel and will shift the adjusting bar 12 in the same direction relative to the ratchet bar 10. As the bar 12 is thus shifted, the teeth of the arm 15 of the pawl will ride on the teeth of the ratchet bar 10, as shown in Fig. 2, and when the wear of the brake shoe and tread of the wheel is such that the teeth of the pawl ride over the teeth of the ratchet bar 10, the spring 17 acts to rock the pawl so that the teeth thereof engage the teeth located forwardly of the teeth they formerly engaged.

In releasing the brakes the brake beam moves in a direction away from the wheel until it is brought to a stop by the stop 20 which, through the medium of the adjusting bar 12, is held against rearward movement by the pawl 14 which is held in locking engagement with the teeth of the ratchet bar 10.

It will thus be seen that if only one end of the brake beam moves toward release position, the stop 20 will serve as a fulcrum for the beam, so that, as the releasing movement of the other elements of the brake rigging continues, the opposite end of the beam will be caused to move into engagement with its adjacent stop 20. By reason of this the desired clearance between the face of each brake shoe and the tread of the truck wheel which it is adapted to contact with, is insured when the brakes are released.

In the foregoing description, I have described my invention as being associated with a brake beam, but I do not wish to be limited to this for it may be employed in beamless brake rigging, and when so employed, the pin 22 which connects the brake shoe head to the hanger or lever or to any other type of hanger, and as shown in Fig. 4, is made long enough to cooperate with lug 13 and stop 18 in substantially the same manner as does the brake beam shown in Figs. 1, 2 and 3.

It will be understood that with either of the two above mentioned types of brake rigging equipped with my improved mechanism for each brake shoe, the releasing movement of each shoe will be limited to that desired, so that as the other elements of the brake rigging continue to move toward the release position, the movement of each brake shoe out of engagement with its respective wheel tread is insured.

To provide for a greater clearance between the face of the brake shoe and the tread of the wheel than is shown in Fig. 1, the adjustable member 19 is moved along the bar 12 in a direction toward the right hand and to provide less clearance the member is moved along the bar 12 in the opposite direction, the bolt 21 being screwed down to clamp the member to the bar in any desired adjusted position.

When it is desired to replace a worn brake shoe the pawl 14 is rocked in a counter-clockwise direction by means of a bar or wedge inserted between the adjusting bar 12 and an arm 23 provided on the pawl 14 until the teeth of the arm 15 are out of engagement with the teeth of the ratchet bar 10. When the pawl is disengaged from the ratchet bar the brake beam by the force of gravity will move the bar 12 and pawl 14 as a unit in a direction toward the right hand.

After the new shoe has been secured to the brake head, the clearance between the shoe and the tread of the adjacent wheel may be more than is desired, but upon effecting an application of the brakes the bar 12 will be so adjusted that upon the release of the brakes the desired clearance will be obtained.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake rigging for railway car trucks, the combination with a truck frame and wheels supporting said frame, a brake shoe movable into and out of braking engagement with one of said wheels, means for actuating said shoe, a stop cooperating with said means to limit the movement of the brake shoe away from said wheel in releasing the brakes to provide a predetermined clearance space between the brake shoe and the wheel, a ratchet bar rigidly secured to said frame, and a ratchet pawl engaging said ratchet bar to lock said stop against movement by said means in releasing the brakes, said pawl permitting movement of the stop by said means when the brake shoe is in braking engagement with the wheel.

2. In a brake rigging for railway car trucks the combination with a truck frame and wheels supporting said frame, a brake shoe movable into and out of braking engagement with one of said wheels, means for actuating said brake shoe, a clutch member rigidly carried by the truck, a member movable by said means when the brake shoe is in braking engagement with said wheel, a stop carried by the last mentioned member adapted to engage said means when in releasing the brakes the brake shoe has moved a predetermined distance from said wheel, and a clutch member pivotally carried by the movable member engaging the first mentioned clutch member to lock the movable member against movement by said means when said means engages with said stop.

3. In a brake rigging for railway car trucks, the combination with a truck frame and wheels supporting said frame, a brake shoe movable into and out of braking engagement with one of said wheels, means for actuating said brake shoe, a clutch member carried by the truck, a member movable by said means when the brake shoe is in braking engagement with said wheel, a stop carried by the last mentioned member adapted to engage said means when in releasing the brakes the brake shoe has moved a predetermined distance from said wheel, a clutch member carried by the movable member and engaging the first mentioned clutch member to lock the movable member against movement by said means when said means engages with said stop, said stop being adjustable relative to the movable member to regulate the distance said shoe is adapted to move away from the wheel, and means for clamping said stop to the movable member in any desired position.

4. In a brake rigging for railway car trucks, the combination with a truck frame and wheels supporting said frame, a brake shoe movable into and out of braking engagement with one of said wheels and a mechanism cooperating with said shoe for stopping the brake shoe a predetermined distance away from the wheel in releasing the brakes, said mechanism comprising a member rigidly secured to the truck frame, a member movable with the brake shoe and relative to the member secured to the truck frame when the shoe is in engagement with the wheel and wear of the shoe occurs, a stop carried by the movable member for limiting the movement of the brake shoe in releasing the brakes, and means carried by the movable member and engaging the member secured to the truck frame for locking the movable member against movement in a direction away from said wheel in releasing the brakes.

5. In a brake rigging for railway car trucks, the combination with a truck frame and wheels supporting said frame, a brake shoe movable into and out of braking engagement with one of said wheels and a mechanism cooperating with said shoe for stopping the brake shoe a predetermined distance away from the wheel in releasing the brakes, said mechanism comprising a member rigidly secured to the truck frame, a bar movable in one direction relative to said member when the brake shoe is in braking engagement with the wheel and wear of the shoe occurs, means cooperating with said member and bar for preventing movement of the bar in the opposite direction when the brakes are released, and a stop on said bar for limiting the release movement of the shoe.

6. In a brake rigging for railway car trucks, the combination with a truck frame and wheels supporting said frame, a brake shoe movable into and out of braking engagement with one of said wheels and a mechanism cooperating with said shoe for stopping the brake shoe a predetermined distance away from the wheel in releasing the brakes, said mechanism comprising a ratchet bar rigidly secured to the truck frame, a member mounted on said bar and movable relative thereto in one direction when the brake shoe is in braking engagement with the wheel and wear of the shoe occurs, a pawl carried by said member adapted to engage said ratchet bar to lock the member against movement in the opposite direction when the brakes are released, and a stop on said member for limiting the release movement of the brake shoe.

7. In a brake rigging for railway car trucks, the combination with a truck frame and wheels supporting said frame, a brake shoe movable into and out of braking engagement with one of said wheels and a mechanism cooperating with said shoe for stopping the brake shoe a predetermined distance away from the wheel in releasing the brakes, said mechanism comprising a ratchet bar rigidly secured to the truck frame, a member mounted on said bar and movable relative thereto in one direction when the brake shoe is in braking engagement with the wheel and wear of the shoe occurs, a pawl pivotally mounted on said member adapted to engage said ratchet bar to lock the member against movement in the opposite direction, a spring urging said pawl into engagement with the ratchet bar, and a stop on said member for limiting the release movement of the brake shoe.

8. In a brake rigging for railway car trucks, the combination with a truck frame and wheels supporting said frame, a brake shoe movable into and out of braking engagement with one of said wheels and a mechanism cooperating with said shoe for stopping the brake shoe a predetermined distance away from the wheel in releasing the brakes, said mechanism comprising a ratchet bar rigidly secured to the truck frame, a member mounted on said bar and movable relative thereto in one direction when the brake shoe is in braking engagement with the wheel and wear of the shoe occurs, a pawl carried by said member adapted to engage said ratchet bar to lock the member against movement in the opposite direction when the brakes are released, and a stop on said member for limiting the release movement of the brake shoe, said stop being adjustable to determine the clearance space between the brake shoe and the wheel.

9. In a brake rigging for railway car trucks, the combination with a truck frame and wheels supporting said frame, a brake shoe movable into and out of braking engagement with one of said wheels and a mechanism cooperating with said shoe for stopping the brake shoe a predetermined distance away from the wheel in releasing the brakes, said mechanism comprising a ratchet bar rigidly secured to the truck frame, a member mounted on said bar and movable relative thereto in one direction when the brake shoe is in braking engagement with the wheel and wear of the shoe occurs, a pawl carried by said member adapted to engage said ratchet bar to lock the member against movement in the opposite direction when the brakes are released, a stop on said member for limiting the releasing movement of the brake shoe, said stop being adjustable to determine the clearance space between the brake shoe and the wheel, and means for securing said stop to said member in its adjusted position.

CLYDE C. FARMER.